(12) United States Patent
Devarakonda

(10) Patent No.: US 9,267,412 B2
(45) Date of Patent: Feb. 23, 2016

(54) EXHAUST AFTERTREATEMENT SYSTEM WITH CATALYTIC DEACTIVATION MONITORING

(71) Applicant: GENERAL ELECTRIC COMPANY, Schenectady, NY (US)

(72) Inventor: Maruthi Narasinga Rao Devarakonda, Waukesha, WI (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 131 days.

(21) Appl. No.: 14/252,849

(22) Filed: Apr. 15, 2014

(65) Prior Publication Data

US 2015/0292383 A1  Oct. 15, 2015

(51) Int. Cl.
*F01N 3/00* (2006.01)
*F01N 3/20* (2006.01)
*F01N 3/22* (2006.01)
*F01N 9/00* (2006.01)
*F01N 11/00* (2006.01)
*F01N 3/10* (2006.01)
*F01N 13/00* (2010.01)

(52) U.S. Cl.
CPC ............... *F01N 3/208* (2013.01); *F01N 3/101* (2013.01); *F01N 3/106* (2013.01); *F01N 3/2006* (2013.01); *F01N 3/22* (2013.01); *F01N 3/225* (2013.01); *F01N 9/00* (2013.01); *F01N 11/00* (2013.01); *F01N 13/009* (2014.06); *F01N 2550/02* (2013.01); *F01N 2560/026* (2013.01); *F01N 2560/06* (2013.01); *F01N 2570/18* (2013.01); *F01N 2900/1602* (2013.01); *F01N 2900/1616* (2013.01); *F01N 2900/1621* (2013.01)

(58) Field of Classification Search
CPC ... F01N 11/00; F01N 13/009; F01N 2550/02; F01N 2560/026; F01N 2560/06; F01N 2570/18; F01N 2900/1602; F01N 2900/1616; F01N 2900/1621; F01N 3/101; F01N 3/106; F01N 3/2006; F01N 3/208; F01N 3/22
See application file for complete search history.

(56) References Cited

U.S. PATENT DOCUMENTS 3,919,842 A * 11/1975 Bolton ...................... F01N 3/22
  137/101
5,746,052 A *  5/1998 Kinugasa ........... B01D 53/9431
  422/171

(Continued)

FOREIGN PATENT DOCUMENTS

EP  2169193 A1  3/2010
EP  2778363 A1  9/2014
EP  2821609 A1  1/2015

OTHER PUBLICATIONS

U.S. Appl. No. 14/252,890, filed Apr. 15, 2014, Maruthi Narasinga Rao Devarakonda.

(Continued)

*Primary Examiner* — Jesse Bogue
(74) *Attorney, Agent, or Firm* — Fletcher Yoder, P.C.

(57) ABSTRACT

A system includes a controller. The controller is configured to monitor a catalytic activity within an ASC assembly that converts ammonia ($NH_3$) within a fluid received from a three-way catalyst (TWC) assembly into nitrogen ($N_2$) to determine whether the catalytic activity in the ASC assembly has aged. The controller is configured to adjust a temperature of the fluid flowing into an inlet of the ASC assembly by controlling an amount of oxidant injected via an oxidant injection system into the fluid upstream of the inlet of the ASC assembly based on a determination that the catalytic activity in the ASC assembly has aged.

20 Claims, 3 Drawing Sheets

(56) References Cited

U.S. PATENT DOCUMENTS

| | | | |
|---|---|---|---|
| 9,056,279 B1 * | 6/2015 | Devarakonda | F01N 3/101 700/274 |
| 2010/0281853 A1 * | 11/2010 | Toshioka | B01D 53/30 60/276 |
| 2011/0182791 A1 | 7/2011 | Fedeyko et al. | |
| 2014/0065041 A1 * | 3/2014 | Szailer | B01D 53/9495 423/212 |

OTHER PUBLICATIONS

U.S. Appl. No. 14/154,418, filed Jan. 14, 2014, Maruthi N. Devarakonda.

European Search Report and Opinion issued in connection with corresponding EP Application No. 15163722.0 on Sep. 2, 2015.

* cited by examiner

| $NO_X$ LEVEL | $T_{ASC}$ IN AGED DES (°C) |
|---|---|
| 90 — $V_1$ | 92 — 400 |
| ⋮ | ⋮ |
| $V_X$ | 510 |

EXHAUST AFTERTREATEMENT SYSTEM WITH CATALYTIC DEACTIVATION MONITORING

BACKGROUND

The subject matter disclosed herein relates to an exhaust aftertreatment system for an internal combustion engine and, more specifically, to monitoring a component of the aftertreatment system for catalytic aging or deactivation.

Engines (e.g., internal combustion engines such as reciprocating engines or gas turbines) combust a mixture of fuel and air to generate combustions gases that apply a driving force to a component of the engine (e.g., to move a piston or drive a turbine). Subsequently, the combustion gases exit the engine as an exhaust, which may be subject to aftertreatment systems that include one or more catalytic converters (e.g., three-way catalyst (TWC) assembly, ammonia slippage catalyst (ASC) assembly, etc.) to reduce the emissions of nitrogen oxides ($NO_X$), hydrocarbons (HC), and carbon monoxide (CO). However, as some of the catalysts of the catalytic converters age, the effectiveness of the catalysts at reducing emissions may decrease.

BRIEF DESCRIPTION

Certain embodiments commensurate in scope with the originally claimed invention are summarized below. These embodiments are not intended to limit the scope of the claimed invention, but rather these embodiments are intended only to provide a brief summary of possible forms of the invention. Indeed, the invention may encompass a variety of forms that may be similar to or different from the embodiments set forth below.

In accordance with a first embodiment, a system includes an exhaust aftertreatment system configured to treat an exhaust from a combustion engine. The exhaust aftertreatment system includes a first catalyst assembly having a first outlet. The exhaust aftertreatment system also includes an ammonia slip catalyst (ASC) assembly configured to receive a fluid from the first catalyst assembly and convert ammonia ($NH_3$) within the fluid into nitrogen ($N_2$). The ASC assembly has an inlet and a second outlet. The exhaust aftertreatment system further includes a fluid conduit disposed between the first catalyst assembly and the ASC assembly and configured to transfer the fluid from the first catalyst assembly to the ASC assembly. The exhaust aftertreatment system yet further includes an oxidant injection system coupled to the fluid conduit and configured to inject air into the fluid conduit to regulate a temperature of the fluid flowing into the inlet of the ASC assembly to regulate catalytic activity in the ASC assembly that converts $NH_3$ into $N_2$. The exhaust aftertreatment system still further includes one or more transducers disposed throughout the exhaust aftertreatment system. The exhaust aftertreatment system even further includes a controller coupled to the air injection system and configured to receive signals from the one or more transducers representative of system parameters, to determine whether the catalytic activity in the ASC assembly has aged based on one of the system parameters, and to adjust the temperature of the fluid flowing into the inlet of the ASC assembly to a desired adjusted temperature to increase the catalytic activity based on a determination that the catalytic activity in the ASC assembly has aged.

In accordance with a second embodiment, a system includes a controller. The controller is configured to monitor a catalytic activity within an ASC assembly that converts $NH_3$ within a fluid received from a TWC assembly into $N_2$ to determine whether the catalytic activity in the ASC assembly has aged. The controller is configured to adjust a temperature of the fluid flowing into an inlet of the ASC assembly by controlling an amount of air injected via an air injection system into the fluid upstream of the inlet of the ASC assembly based on a determination that the catalytic activity in the ASC assembly has aged.

In accordance with a third embodiment, a method of compensating for decreased catalytic activity within an ASC assembly in an exhaust aftertreatment system of a combustion engine is provided. The method includes determining whether catalytic activity within the ASC assembly has decreased. The method also includes, if the catalytic activity within the ASC assembly has decreased, adjusting the temperature of the fluid flowing into the ASC assembly by injecting an amount of oxidant into the fluid upstream of the ASC assembly.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein:

FIG. 3 is a graphical representation of an embodiment of a table that includes an amount of $NO_X$ and desired temperature for fluid entering into the inlet of the ASC assembly based on the amount of $NO_X$.

DETAILED DESCRIPTION

Figure 1:
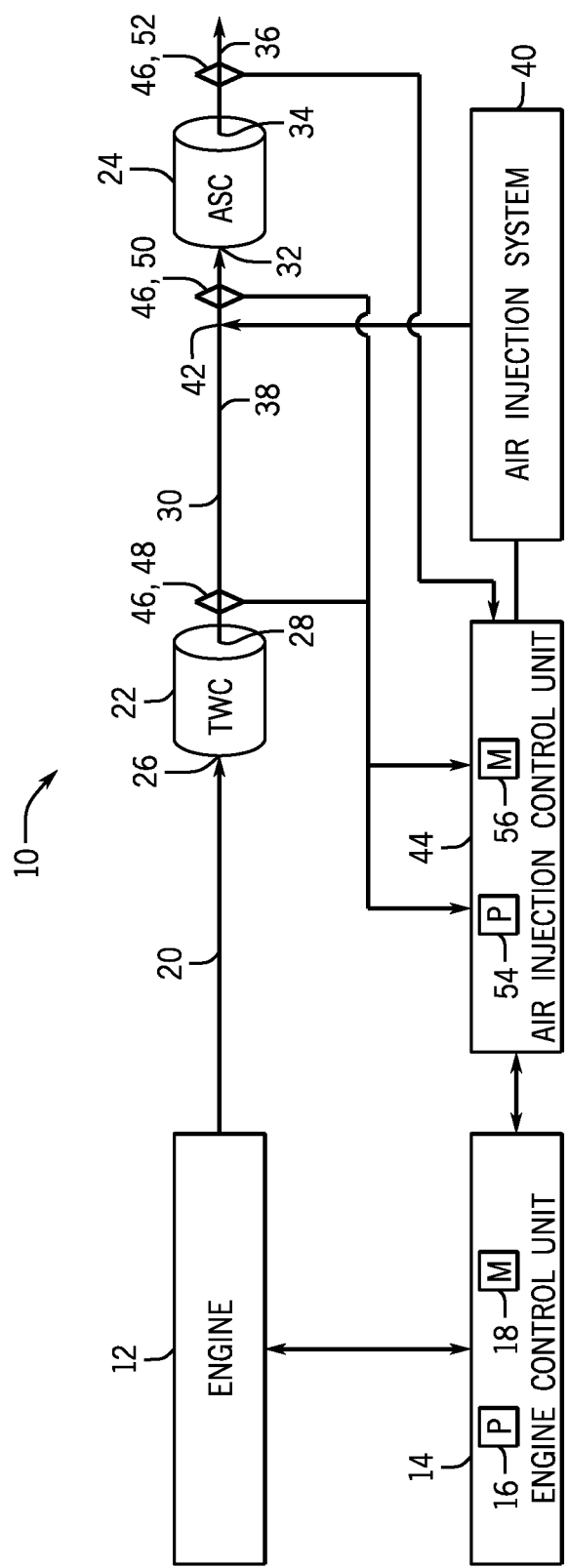
FIG. 1 is a schematic diagram of an embodiment of an aftertreatment (e.g., exhaust treatment) system coupled to an engine.

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements.

The present disclosure is directed to systems and methods for monitoring the aging of catalysts in catalytic converters and adjusting conditions in response to detecting aging (e.g., deactivated) catalysts. Although the system and methods are discussed in terms of monitoring catalytic converters for aging catalysts, in certain embodiments, the techniques described herein may be applied to thermal aging and chemical poisoning of the catalysts. In particular, embodiments of the present disclosures include an aftertreatment system configured to couple to a combustion engine (e.g., reciprocating internal combustion engine or gas turbine engine) and to treat emissions (e.g., in the engine exhaust) from the internal combustion engine (e.g., $NO_X$, HC, CO, etc.). The disclosed embodiments may be used to monitor and control any type of aftertreatment (e.g., exhaust treatment) system, such as catalyst based systems, chemical injection systems, or other types. The aftertreatment system includes a TWC assembly (e.g., first catalyst assembly), and an ASC assembly (e.g., second catalyst assembly) that receives a fluid (e.g., treated exhaust flow) from the TWC assembly and converts $NH_3$ into molecular nitrogen ($N_2$) and CO into carbon dioxide ($CO_2$) and water. A fluid conduit is disposed between the TWC assembly and the ASC assembly that transfers (e.g., enables flow) of the fluid from the TWC assembly to the ASC assembly. An air or oxidant injection system (e.g., mid-bed air injection system) is coupled to the fluid conduit and injects an oxidant (e.g., air, $O_2$, oxygen-enriched air, or oxygen-reduced air) into the fluid conduit to regulate a temperature of the fluid flowing into an inlet of the ASC assembly to regulate catalytic activity in the ASC assembly that converts $NH_3$ into $N_2$. Multiple transducers or sensors (e.g., temperature sensors and/or $NO_X$ sensors) may be disposed throughout the aftertreatment system (e.g., adjacent an outlet of the TWC assembly, adjacent the inlet of the ASC assembly, and/or adjacent an outlet of the ASC assembly). A controller (e.g., air injection controller) is coupled to the air injection system. The controller receives signals from the multiple transducers representative of system parameters (e.g., temperature of fluid exiting the TWC assembly, temperature of the fluid entering the ASC assembly, and/or levels of $NO_x$ in the fluid exiting the ASC assembly). The controller monitors the catalytic activity in the ASC assembly and determines whether the catalyst or catalytic activity in the ASC assembly has aged (e.g., deactivated or decreased in catalytic activity) based on one of the system parameters. Based on a determination that the catalytic activity in the ASC assembly has aged, the controller adjusts the temperature of the fluid flowing into the inlet of the ASC assembly to a desired adjusted temperature (e.g., by adjusting an amount of oxidant (e.g., air, $O_2$, oxygen-enriched air, or oxygen-reduced air) injected by the air injection system into the fluid conduit) to increase the catalytic activity in the ASC assembly. In certain embodiments, the controller may receive a signal representative of the level of $NO_X$ in the fluid exiting the ASC assembly (e.g., via a $NO_X$ sensor disposed adjacent the outlet of the ASC assembly), compare the level of $NO_X$ to a $NO_X$ threshold value, determine the catalytic activity in the ASC assembly has aged if the level of $NO_X$ is greater than the $NO_X$ threshold value, and determine the desired adjusted temperature based on the detected level of $NO_X$ in the fluid exiting the ASC assembly. By diagnosing catalyst aging in the ASC assembly and actively controlling the temperature of the fluid flowing into the ASC assembly to counteract the effects of catalyst aging, emissions may be reduced and catalytic activity of the ASC assembly maximized.

Turning now to the drawings and referring to FIG. 1, a schematic diagram of an aftertreatment system 10 coupled to an engine 12 is illustrated. As described in detail below, the disclosed aftertreatment system 10 monitors the catalytic activity of components (e.g., ASC assembly) for aging (e.g., decrease in catalytic activity) of the catalysts and, if aging is present, actively controls or adjusts a temperature of a fluid flow (e.g., treated exhaust flow) to counter the aging of the catalysts. The engine 12 may include an internal combustion engine such as a reciprocating engine (e.g., multi-stroke engine such as two-stroke engine, four-stroke engine, six-stroke engine, etc.) or a gas turbine engine. The engine 12 may operate on a variety fuels (e.g., natural gas, diesel, syngas, gasoline, etc.). The engine 12 may operate as a lean-burn engine or a rich-burn engine. The engine 12 is coupled to an engine control unit (e.g., controller) 14 that controls and monitors the operations of the engine 12. The engine control unit 14 includes processing circuitry (e.g., processor 16) and memory circuitry (e.g., memory 18). The processor 16 may execute instructions to carry out the operation of the engine 12. These instructions may be encoded in programs or code stored in a tangible non-transitory computer-readable medium (e.g., an optical disc, solid state device, chip, firmware) such as the memory 18.

During operation, the engine 12 generates combustion gases 20 used to apply a driving force to a component of the engine 12 (e.g., one or more pistons or turbines). The combustion gases 20 subsequently exit the engine 12 as an exhaust 20, which includes a variety of emissions (e.g., $NO_X$, HC, CO, etc.). The aftertreatment system 10 treats these emissions to generate milder emissions (carbon dioxide ($CO_2$), water, etc). As depicted, the aftertreatment system 10 includes catalytic converters such as the TWC assembly 22 and the ASC assembly 24. In embodiments that include the TWC assembly 22 and the ASC assembly 24, the engine 12 may be operated as a rich-burn engine to maximize the catalytic activity in both the TWC assembly 22 and the ASC assembly 24. The TWC assembly 22, via its catalytic activity, reduces $NO_X$ via multiple reactions. For example, $NO_X$ may be reduced via CO to generate $N_2$ and $CO_2$, $NO_X$ may be reduced via $H_2$ to generate $NH_3$ and water, and $NO_X$ may be reduced via a hydrocarbon (e.g., $C_3H_6$) to generate $N_2$, $CO_2$, and water. The TWC 22 assembly also oxidizes CO to $CO_2$, and oxidizes unburnt HC to $CO_2$ and water. A by-product of the reduction of $NO_X$ in the TWC assembly is the emission of $NH_3$ as a result of ammonia slippage (e.g., due to unreacted $NH_3$). In certain embodiments, instead of the TWC assembly 22, any catalytic converter that reduces $NO_X$ may be utilized. The ASC assembly 24, via its catalytic activity, reduces the $NH_3$ to $N_2$. In certain embodiments, the ASC assembly 24 also oxidizes CO to $CO_2$. An unaged (e.g., having complete catalytic activity) catalyst in the ASC assembly 24 generally converts all of the $NH_3$ to $N_2$. The ASC assembly 24 includes a catalyst operating window between upper and lower temperature thresholds, such as between approximately 400-510 ° C. The operating window represents a temperature where all of the $NH_3$ may be converted to $N_2$ and not oxidized to $NO_X$.

The TWC assembly 22 includes an inlet 26 to receive the exhaust 20 from the engine 12 and an outlet 28 to discharge a fluid 30 (e.g., treated engine exhaust). The ASC assembly 24 includes an inlet 32 to receive the fluid 30 (e.g., including the treated engine exhaust and/or injected oxidant (e.g., air, $O_2$, oxygen-enriched air, or oxygen-reduced air)) and an outlet 34 to discharge an additionally treated fluid 36. A fluid conduit 38 is disposed between the TWC assembly 22 and the ASC assembly 24. Specifically, the fluid conduit 38 is coupled to the outlet 28 of the TWC assembly 22 and the inlet 32 of the ASC assembly 24, thus, coupling both assemblies 22, 24 to enable fluid communication between them. The fluid conduit 38 enables the flow or transfer of the fluid 30 from the TWC assembly 22 to the ASC assembly 24.

As depicted, an air or oxidant injection system 40 (e.g., mid-bed air injection system) is coupled to the fluid conduit 38. The air injection system 40 injects oxidant (e.g., air, $O_2$, oxygen-enriched air, or oxygen-reduced air) into the fluid 30 within the fluid conduit 38 at a point or location 42 downstream of the outlet 28 of the TWC assembly 22 and upstream of the inlet 32 of the ASC assembly 24. In certain embodiments, oxidant injection via the air injection system 40 may be actively driven via a pump or injector. In other embodiments, the air injection system 40 may occur via passive entrainment. The injection of oxidant (e.g., air, $O_2$, oxygen-enriched air, or oxygen-reduced air), via the air injection system 40, regulates a temperature of the fluid 30 (e.g., including the treated engine exhaust and/or injected oxidant (e.g., air, $O_2$, oxygen-enriched air, or oxygen-reduced air)) entering the ASC assembly 24.

An air injection control unit 44 (e.g., processor-based controller) controls an amount of air (e.g., $O_2$) injected by the air injection system 40 to regulate (e.g., actively control) a temperature of the fluid 30 into the inlet 32 of the ASC assembly 24. By controlling the temperature of the fluid, the air injection control unit 44 keeps the temperature of the fluid 30 entering the inlet 32 of the ASC assembly 24 at a desired temperature within the catalyst operating window (e.g., within upper and lower temperature thresholds) of the ASC assembly 24 to minimize emission of $NO_X$ from the ASC assembly 24. By maintaining the temperature of the fluid 30 within the catalyst operating window (where all of the $NH_3$ may be converted to $N_2$), the presence of $NO_X$ in the fluid 36 exiting the ASC assembly 24 is utilized by the air injection control unit 40 to monitor the catalyst or catalytic activity of the ASC assembly 24 for aging (e.g., catalytic deactivation or decrease in catalytic activity) and/or further modify the temperature of the fluid 30 into the inlet 32 of the ASC assembly 24 based on a determination of aging catalytic activity.

The aftertreatment system 10 includes a plurality of transducers or sensors 46 disposed throughout the system 10 to measure systems parameters (e.g., temperature, emissions concentration (e.g., $NO_X$), etc.) and to provide feedback (e.g., via signals representative of the system parameter) to the air injection control unit 44. For example, one or more temperature transducers 48 are disposed adjacent or proximal (e.g., downstream of) the outlet 28 of the TWC assembly 22 and one or more temperature transducers 50 disposed adjacent or proximal the inlet 32 of the ASC assembly 24 (e.g., upstream of the inlet 32 and downstream of both the temperature transducer 48 and the point 42 of oxidant injection). The temperature transducer 48 measures the temperature of the fluid 30 exiting the outlet 28 of the TWC assembly 22. The temperature transducer 50 measures the temperature of the fluid 30 entering the inlet 32 of the ASC assembly 24. The temperature transducers 48, 50 may include a thermocouple, resistance temperature detector, or any other kind of temperature measuring device. The transducers 46 also include one or more $NO_X$ transducers 52 disposed adjacent or proximal (e.g., downstream of) the outlet 34 of the ASC assembly 24. The $NO_X$ transducer 52 measures an amount or level of $NO_X$ (e.g., in ppm) in the fluid 36.

Based on feedback from the temperature transducers 48, 50, the injection control unit 44 can actively control the temperature of the fluid 30 entering the inlet 24 of the ASC assembly 24 to maintain the temperature of the fluid at a desired temperature within the catalyst operating window of the ASC assembly 24. For example, as described in greater detail below, the air injection control unit 44 may analyze the difference between the temperature of the fluid 30 exiting the TWC assembly 22 and a desired temperature for the fluid 30 entering the ASC assembly 24 and, if the temperature of the fluid 30 exiting the TWC assembly 22 is greater than the desired temperature of the fluid 30 entering the ASC assembly 24, then the control unit 44 may determine an amount of oxidant to inject (e.g., via the air injection system 40) to make the actual temperature of the fluid 30 entering the ASC assembly 24 approximately equal (e.g., within approximately 1° C. or less) to the desired temperature of the fluid 30 entering the ASC assembly 24. The oxidant enables oxidation of CO and selective oxidation of $NH_3$ within the ASC assembly 24.

Based on feedback from the one or more $NO_X$ transducers 52, the air injection control unit 44 monitors for (e.g., diagnoses or detects) aging of the catalyst (e.g., catalytic activity) within the ASC assembly 24. For example, the air injection control unit 44 may compare the level (e.g., value) of $NO_X$ (e.g., nitrogen monoxide and nitrogen dioxide) obtained from the transducer 52 to a $NO_X$ threshold value to determine if aging of the catalyst of the ASC assembly 24 has occurred (e.g., if the level of measured $NO_X$ is greater than the $NO_X$ threshold value). In certain embodiments, the comparison of the measured $NO_X$ to the $NO_X$ threshold value may occur subsequent to a determination by the air injection control unit 44 that the actual temperature of the fluid 30 entering the ASC assembly 24 is approximately equal (e.g., within approximately 1° C. or less) to the desired temperature of the fluid 30 entering the ASC assembly 24. Based on a determination of an aging catalyst within the ASC assembly 24, the air injection control unit 44 can actively control the temperature of the fluid 30 entering the ASC assembly 24 to adjust the temperature (within the catalyst operating window), via injecting a certain amount of oxidant (e.g., air, $O_2$, oxygen-enriched air, or oxygen-reduced air) using the air injection system, to a desired temperature to increase the catalytic activity within the ASC assembly 24 to counteract the aging of the catalyst within the ASC assembly 24. In certain embodiments, the air injection control unit 44 may keep track of a number of times (e.g., consecutive times) a catalyst aging determination has been made and the temperature of the fluid 30 has been adjusted to counteract the aging of the catalyst within the ASC assembly 24 and, if the number of times reaches a certain threshold, then the unit 44 may recommend correction action (e.g., cleaning of the ASC assembly 24) in lieu of adjusting the temperature of the fluid 30 any further.

The air injection control unit 44 includes processing circuitry (e.g., processor 54) and memory circuitry (e.g., memory 56). The processor 54 may execute instructions to monitor system parameters (temperature, emissions levels (e.g., $NO_X$), etc.), actively control the temperature of the fluid 30 entering the inlet 32 of the ASC assembly 24, and/or monitor the catalyst of the ASC assembly 24 for aging. These instructions may be encoded in programs or code stored in a tangible non-transitory computer-readable medium (e.g., an optical disc, solid state device, chip, firmware) such as the memory 56. The processor 54 may also access tables or values stored in the memory 56. For example, a table stored on the memory 56 may include how much oxidant (e.g., air, $O_2$, oxygen-enriched air, or oxygen-reduced air) to inject based on a difference between the temperature of the fluid 30 exiting the TWC assembly 22 and a desired temperature for the fluid 30 entering the ASC assembly 24. The memory 56 may also store one or more $NO_X$ threshold values and/or a table that includes a desired temperature for the fluid 30 entering the ASC assembly 24 based on the degree or amount of aging of the catalyst in the ASC assembly 24 (e.g., amount of $NO_X$ measured or a difference between the amount of $NO_X$ measured and the $NO_X$ threshold value). The memory 56 may also store one or more threshold values for the number of times a catalyst aging determination may be made and the temperature of the fluid 30 may be adjusted due to catalyst aging before corrective action is recommended. The memory

56 may store computer models (e.g., related to $NO_X$ emissions from and aging of the ASC assembly 24), knowledge based data, and/or historical data (e.g., past $NO_X$ emissions from the ASC assembly 24, past temperature readings and/or desired temperatures, etc.) related to the emissions and temperatures of the aftertreatment system 10. As depicted, the air injection control unit 44 is coupled to the engine control unit 14. In certain embodiments, the air control unit 44 and the engine control unit 14 may form a single control unit.

Figure 2:
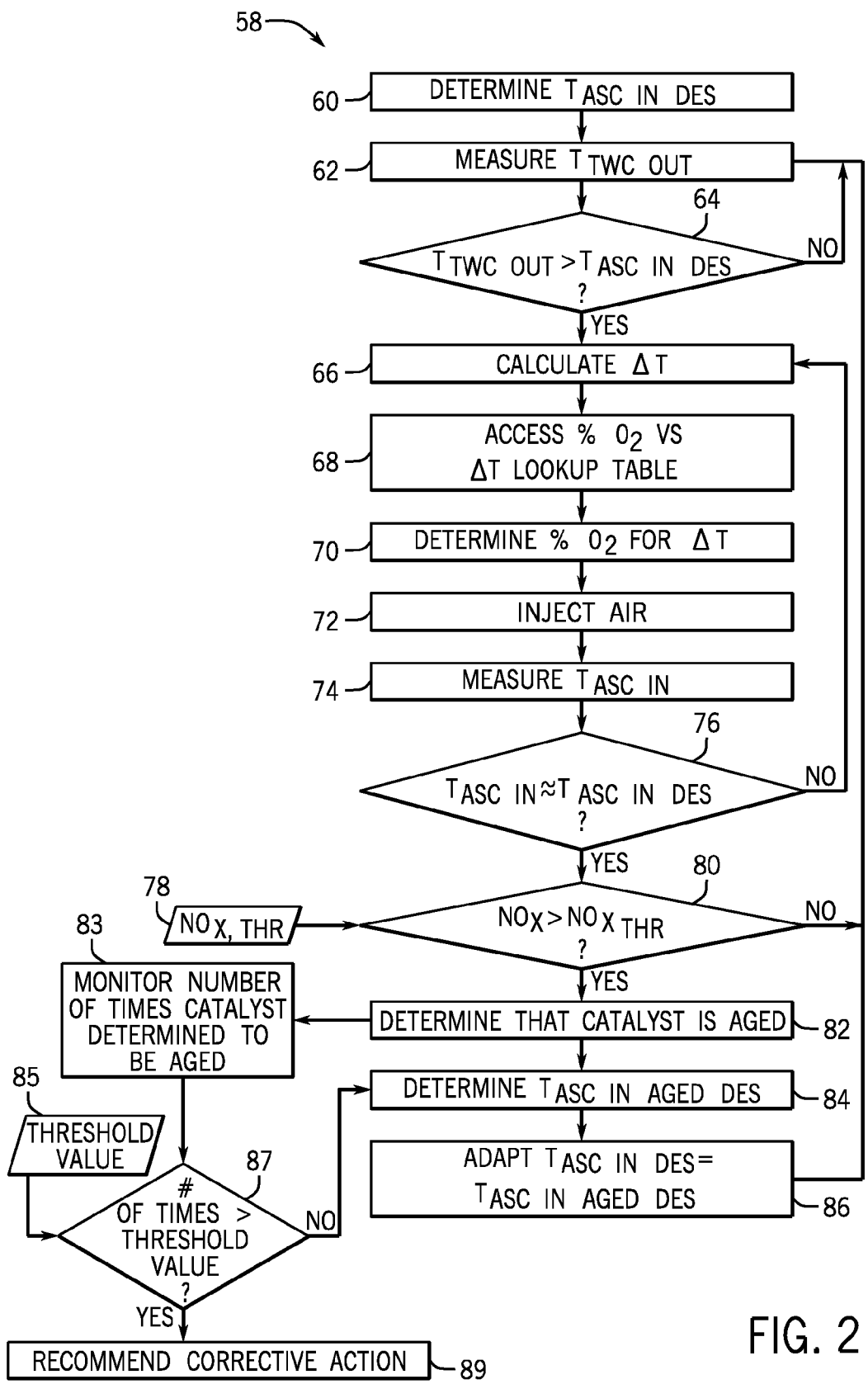
FIG. 2 is a flow chart of an embodiment of a computer-implemented method for monitoring an ASC assembly for catalyst aging and actively controlling a temperature of fluid into an inlet of the ASC assembly based on the monitoring.

FIG. 2 is a flow chart of an embodiment of a computer-implemented method 58 for monitoring the ASC assembly 24 for catalyst aging and actively controlling the temperature of the fluid 30 into the inlet 32 of the ASC assembly 24. All or some of the steps of the method 58 may be executed by the air injection control unit 44 (e.g., utilizing the processor 18 to execute programs and access data stored on the memory 56). The method 58 includes determining a desired temperature ($T_{ASC\ IN\ DES}$) (e.g., within the catalyst operating window of the ASC assembly 24) for the fluid 30 entering the inlet 32 of the ASC assembly 24 (block 60). For example, the air injection unit 44 may include a number of values for $T_{ASC\ IN\ DES}$ (e.g., stored in memory 56) based on the fuel utilized by the engine 12 or other operating characteristics of the engine 12 (e.g., operating under rich-burn or lean-burn conditions). In certain embodiments, these values for $T_{ASC\ IN\ DES}$ may be derived from computer models. In certain embodiments, the air injection control unit 44 may obtain the information to determine the $T_{ASC\ IN\ DES}$ from the engine control unit 14. Alternatively, the $T_{ASC\ IN\ DES}$ may be inputted by a user. The method 58 also includes measuring the actual temperature ($T_{TWC\ OUT}$) of the fluid 30 exiting the outlet 28 of the TWC assembly 22 (e.g., via temperature transducer 48) (block 62). The method 58 further includes determining if $T_{TWC\ OUT}$ is greater than $T_{ASC\ IN\ DES}$ (block 64). If $T_{TWC\ OUT}$ is not greater than $T_{ASC\ IN\ DES}$, than measuring the $T_{TWC\ OUT}$ continues (block 62). If $T_{TWC\ OUT}$ is greater than $T_{ASC\ IN\ DES}$, then the method 58 includes measuring a difference in temperature ($\Delta T$) between $T_{TWC\ OUT}$ and $T_{ASC\ IN\ DES}$ (block 66). Based on the $\Delta T$, the method 58 includes accessing a look-up table (e.g., in memory 56) that provides specific percentages of oxygen (% $O_2$) to be injected into the fluid conduit 38 for specific values of $\Delta T$ (block 68). From this table, the method 58 includes determining the % $O_2$ for the calculated $\Delta T$ (block 70). Based on the determined % $O_2$, the method 58 includes injecting oxidant (e.g., air, $O_2$, oxygen-enriched air, or oxygen-reduced air) into the fluid conduit 38 (e.g., at point 42) adjacent to but upstream of the temperature transducer 50 and the inlet 32 of the ASC assembly 24 (block 72). After injecting the oxidant, the method 58 includes measuring (e.g. via temperature transducer 50) the actual temperature of the fluid 30 entering the inlet 32 of the ASC assembly 24 ($T_{ASC\ IN}$) (block 74). If $T_{ASC\ IN}$ is not approximately equal to $T_{ASC\ IN\ DES}$, then the method 58 returns to measuring $T_{TWC\ OUT}$ (block 58) and determining any adjustments to achieve $T_{ASC\ IN\ DES}$ (blocks 64-76).

If $T_{ASC\ IN}$ is approximately equal (e.g., within approximately 1° C. or less) to $T_{ASC\ IN\ DES}$, then the method 58 determines if the value of the level or amount of measured $NO_X$ (e.g., measured via the $NO_X$ transducer 52) in the fluid 36 exiting the ASC assembly 24 is greater than a $NO_X$ threshold value 78 (block 80). The $NO_X$ threshold value 78 may be obtained from the memory 56. Also, the $NO_X$ threshold value 78 may be inputted by a user. The $NO_X$ threshold value 78 may be empirically derived when initially setting up the ASC assembly 24. If the value of the level or amount of measured $NO_X$ is not greater than the $NO_X$ threshold value 78 ($NO_{X\ THR}$), the method 58 returns to measuring $T_{TWC\ OUT}$ (block 62), determining any adjustments to achieve $T_{ASC\ IN\ DES}$ (blocks 64-76), and determining again if the value of the level or amount of measured $NO_X$ is greater than the $NO_X$ threshold value 78 (block 80). If the value of the level or amount of measured $NO_X$ is not greater than the $NO_X$ threshold value 78, the method 58 includes determining that the catalyst or catalytic activity of the ASC assembly 24 has aged (e.g., decreased in catalytic activity) (block 82). In certain embodiments, determining the aging may include determining an actual amount or degree of aging (e.g., a scaled range of aging). Upon determining that the catalyst of the ASC assembly 24 has aged, the method 58 includes determining a desired temperature ($T_{ASC\ IN\ AGED\ DES}$) (e.g., within the catalyst operating window of the ASC assembly 24) for the fluid 30 entering the inlet 32 of the ASC assembly 24 with the aged catalyst or catalytic activity (block 84). The air injection control unit 44 may access (e.g., in memory 56) a look-up table that provides specific values for $T_{ASC\ IN\ AGED\ DES}$ for specific amounts of $NO_X$ measured or a difference between the amount of $NO_X$ measured and the $NO_X$ threshold value 78. After determining $T_{ASC\ IN\ AGED\ DES}$, the method 58 includes adapting the $T_{ASC\ IN\ DES}$ to equal $T_{ASC\ IN\ AGED\ DES}$ (block 86) and returning measuring $T_{TWC\ OUT}$ (block 62), determining any adjustments to achieve $T_{ASC\ IN\ DES}$ (now equal to $T_{ASC\ IN\ AGED\ DES}$) (blocks 64-76), and repeating steps 80-86 of the method 58 to determine if adjusting $T_{ASC\ IN}$ to approximately equal (e.g., within approximately 1° C. or less) $T_{ASC\ IN\ AGED\ DES}$ affects the catalytic activity of the ASC assembly 24 (e.g., increases the catalytic activity and reduces $NO_X$ emissions in the fluid 36).

The aging of the ASC assembly 24 may be utilized in a variety of ways. For example, a life of the ASC assembly 24 may be predicted, maintenance for or replacement of the ASC assembly 24 may be utilized, or any other action based on trends or the estimated life of the aging ASC assembly 24.

In certain embodiments, the method 58 may monitor a number of times (e.g., consecutive times) it has been determined that the catalyst has aged in the ASC assembly 24 and, subsequently, the temperature of the fluid 30 has been adjusted in response to the determination that the catalytic activity of the ASC assembly 24 has aged (block 83). Upon each determination that the amount of $NO_X$ is greater than the $NO_X$ threshold value 78, a value of 1 may be added to the number of times it has been determined that the catalyst has aged in the ASC assembly 24. In certain embodiments, the number of times may be reset if it is determined that the amount of $NO_X$ is not greater than the $NO_X$ threshold value 78. The number of times the catalyst has been determined to be aged may be compared to a threshold value 85 (block 87). If the number of times is less than or equal to the threshold value 85, then the method 58 includes determining the desired temperature ($T_{ASC\ IN\ AGED\ DES}$) (e.g., within the catalyst operating window of the ASC assembly 24) for the fluid 30 entering the inlet 32 of the ASC assembly 24 with the aged catalyst or catalytic activity (block 84). If the number of times is greater than the threshold value 85, the method 58 includes recommending a correction action (e.g., cleaning of the ASC assembly 24) (block 89). The recommendation may be provided via user-perceptible indicator (e.g., a display of the control units 14, 44 or a remote display). The recommendation may take the form of a textual, audio, or visual indicator (e.g., LED). Alternative to monitoring a number of times the catalyst has aged, it may be determined that no further adjustments within the temperature operating window of the ASC assembly 24 can be made and thus the corrective action may be recommended.

FIG. 3 is a graphical representation of an embodiment of a table 88 (e.g., utilized in step 84 of the method 58) that includes amounts of $NO_X$ 90 (e.g., nitrogen monoxide and nitrogen dioxide) and $T_{ASC\ IN\ AGED\ DES}$ 92 for fluid 30 entering into the inlet 32 of the ASC assembly 24 based on the amount of $NO_X$ 90. The amounts of $NO_X$ 90 may be represented as a measured value for $NO_X$ or a difference between the amount of $NO_X$ measured and the $NO_X$ threshold value. In certain embodiments, the $T_{ASC\ IN\ AGED\ DES}$ 92 may be represented as values (in °C.) within the catalyst operating window of the ASC assembly 24.

Technical effects of the disclosed embodiments include providing computer implemented systems and methods for diagnosing an aged catalyst or catalytic activity in the ASC assembly 24 and actively controlling the temperature of the fluid 30 entering the inlet 32 of the ASC assembly 24, if the catalyst is aged, to increase the catalytic activity of the ASC assembly 24. In particular, embodiments include the aftertreatment system 10 that includes the air injection control unit 44 that controls an amount of oxidant injected into the fluid conduit 38 upstream of the inlet 32 of the ASC assembly 24 via the air injection system 40. The system 10 includes at least one $NO_X$ transducer 52 downstream of the outlet 34 of the ASC assembly 24 to provide feedback to the air injection control unit 44 as to the level of $NO_X$ emissions in the fluid 36. Based on the level of $NO_X$ emissions, the air injection control unit 44 can determine if the catalyst in the ASC assembly 24 has aged, and, if the catalyst has aged, the control unit 44 may adjust the temperature of the fluid 30 entering the ASC assembly 24 to a desired temperature to increase the catalyst activity of the ASC assembly 24. By diagnosing whether the catalyst of the ASC assembly 24 has aged and, in response, actively controlling the temperature of the fluid 30 entering the ASC assembly 24 if the catalyst aged, the catalytic activity of the ASC assembly 24 may be maximized and $NO_X$ emissions reduced.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A system, comprising:
   an exhaust aftertreatment system configured to treat emissions from a combustion engine, wherein the exhaust aftertreatment system comprises:
   a first catalyst assembly having a first outlet;
   an ammonia slip catalyst (ASC) assembly configured to receive a fluid from the first catalyst assembly and to convert ammonia ($NH_3$) within the fluid into nitrogen ($N_2$), wherein the ASC assembly has an inlet and a second outlet;
   a fluid conduit disposed between the first catalyst assembly and the ASC assembly and configured to transfer the fluid from the first catalyst assembly to the ASC assembly;
   an oxidant injection system coupled to the fluid conduit and configured to inject oxidant into the fluid conduit to regulate a temperature of the fluid flowing into the inlet of the ASC assembly to regulate a catalytic activity in the ASC assembly that converts $NH_3$ into $N_2$;
   one or more transducers disposed throughout the exhaust aftertreatment system; and
   a controller coupled to the oxidant injection system and configured to receive signals from the one or more transducers representative of system parameters, to determine whether the catalytic activity in the ASC assembly has aged based on one of the system parameters, and to adjust the temperature of the fluid flowing into the inlet of the ASC assembly to a desired adjusted temperature to increase the catalytic activity based on a determination that the catalytic activity in the ASC assembly has aged.

2. The system of claim 1, wherein the system parameter to determine whether the catalytic activity in the ASC assembly has aged is a level of nitrogen oxides ($NO_X$) in the fluid.

3. The system of claim 2, wherein the one or more transducers comprises at least one $NO_X$ transducer disposed downstream of the second outlet of the ASC assembly and configured to measure an amount of $NO_X$ in the fluid that has flowed through the ASC assembly.

4. The system of claim 2, wherein the controller is configured to determine whether the catalytic activity in the ASC assembly has aged by determining if the amount of $NO_X$ in the fluid is greater than a $NO_X$ threshold value.

5. The system of claim 4, wherein the controller is configured to determine the desired adjusted temperature based on the amount of $NO_X$ in the fluid.

6. The system of claim 2, wherein the system parameters comprise the temperature of the fluid at the inlet of the ASC assembly, and wherein the controller is configured to determine whether the catalytic activity in the ASC assembly has aged based on the amount of $NO_X$ in the fluid subsequent to determining that the temperature of the fluid at the inlet of the ASC assembly is approximately equal to a desired temperature of the fluid at the inlet of the ASC assembly.

7. The system of claim 1, wherein the controller is configured to monitor a number of times that a determination of aging in the catalytic activity of the ASC assembly has been made, and, if the number of times is greater than a threshold value, recommend corrective action.

8. The system of claim 1, wherein the controller is configured to adjust the temperature to the desired adjusted temperature by controlling an amount of oxidant injected into the fluid conduit.

9. The system of claim 1, comprising the combustion engine coupled to the exhaust aftertreatment system.

10. A system, comprising:
    a controller configured to monitor a catalytic activity within an ammonia slip catalyst (ASC) assembly that converts ammonia ($NH_3$) within a fluid received from a three-way catalyst (TWC) assembly into nitrogen ($N_2$) to determine whether the catalytic activity in the ASC assembly has aged, and the controller is configured to adjust a temperature of the fluid flowing into an inlet of the ASC assembly by controlling an amount of oxidant injected via an oxidant injection system into the fluid upstream of the inlet of the ASC assembly based on a determination that the catalytic activity in the ASC assembly has aged.

11. The system of claim 10, wherein the controller is configured receive a signal from at least one $NO_X$ sensor disposed adjacent an outlet of the ASC assembly, wherein the signal is representative of a level of nitrogen oxides ($NO_X$) in the fluid that has flowed through the ASC assembly.

12. The system of claim 11, wherein the controller is configured to determine whether the catalytic activity in the ASC assembly has aged by determining if the amount of $NO_X$ in the fluid is greater than a $NO_X$ threshold value.

13. The system of claim 12, wherein the controller is configured to adjust the temperature to a desired adjusted temperature that increases the catalytic activity within the ASC assembly.

14. The system of claim 13, wherein the controller is configured to determine the desired adjusted temperature based on the amount of $NO_X$ in the fluid.

15. The system of claim 12, wherein the controller is configured to receive additional signals from temperature sensors disposed adjacent an outlet of the TWC assembly and adjacent the inlet of the ASC assembly.

16. The system of claim 15, wherein the controller is configured to determine whether the catalytic activity in the ASC assembly has aged based on the amount of $NO_X$ in the fluid subsequent to determining that the temperature of the fluid at the inlet of the ASC assembly is approximately equal to a desired temperature of the fluid at the inlet of the ASC assembly.

17. The system of claim 10, comprising an exhaust aftertreatment system having the controller, wherein the exhaust aftertreatment system comprises the TWC assembly, the ASC assembly, and the oxidant injection system, and wherein the exhaust aftertreatment system is configured to be coupled to a combustion engine and to treat emissions from the combustion engine.

18. A method of compensating for decreased catalytic activity within an ammonia slip catalyst (ASC) assembly in a exhaust aftertreatment system of a combustion engine, comprising:
  determining whether catalytic activity within the ASC assembly has decreased; and
  if the catalytic activity within the ASC assembly has decreased, adjusting the temperature of fluid flowing into the ASC assembly by injecting an amount of oxidant into the fluid upstream of the ASC assembly.

19. The method of claim 18, wherein determining whether the catalytic activity within the ASC assembly has decreased comprises receiving feedback from at least one $NO_X$ sensor disposed adjacent an outlet of the ASC assembly to determine a level of nitrogen oxides ($NO_X$) in the fluid that has flowed through the ASC assembly.

20. The method of claim 18, wherein adjusting the temperature of fluid flowing into the ASC assembly comprises utilizing a controller to adjusts injection of the oxidant to control the temperature of the fluid to a temperature setpoint to achieve a desired catalytic activity setpoint within the ASC assembly.

* * * * *